Sept. 28, 1965    C. M. JOHNSON ETAL    3,208,165
EARTH SCRAPER WITH HYDRAULICALLY OPERATED CONVEYOR
Filed Feb. 1, 1963    2 Sheets-Sheet 2
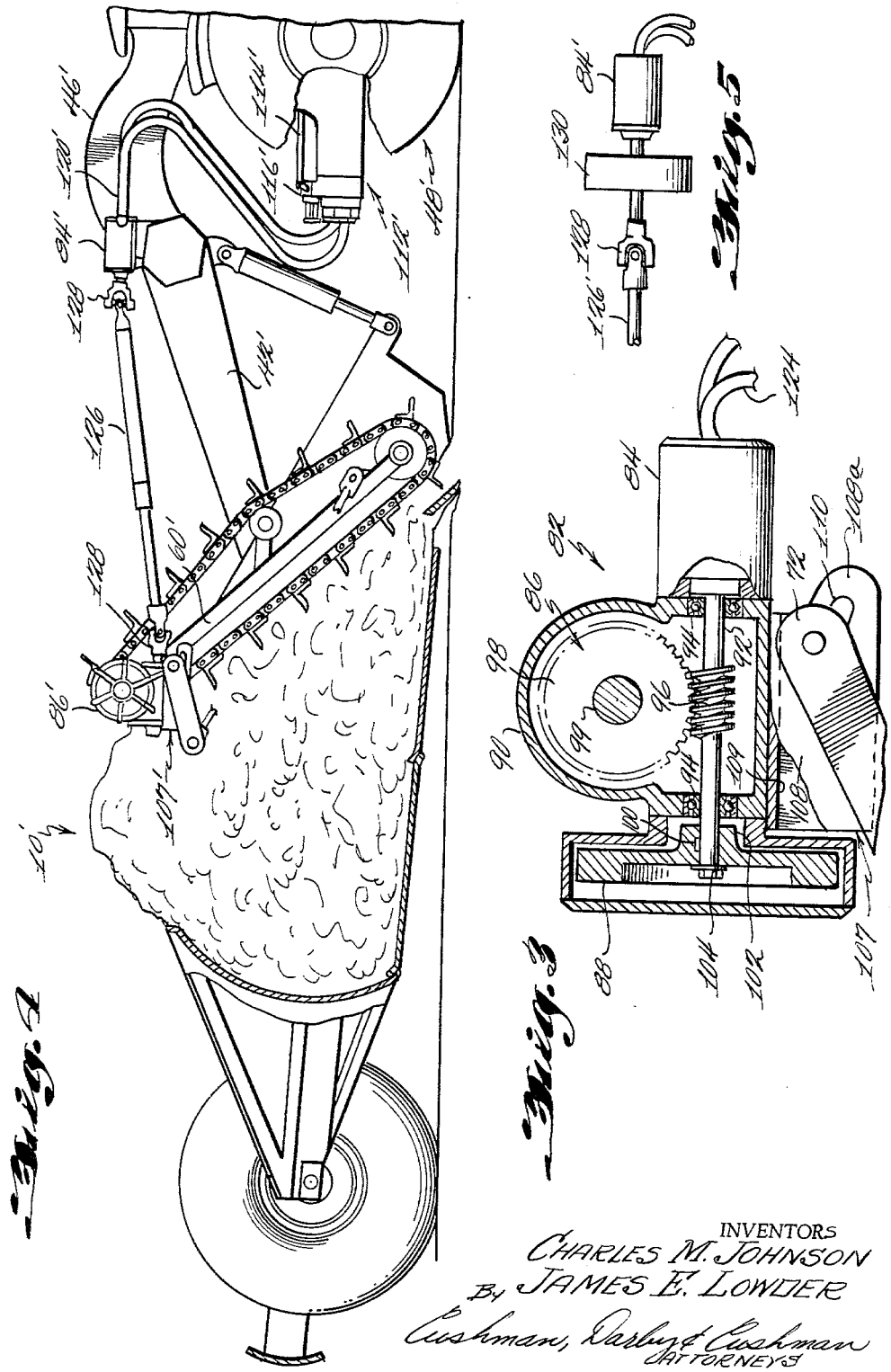
INVENTORS
CHARLES M. JOHNSON
BY JAMES E. LOWDER
Cushman, Darby & Cushman
ATTORNEYS

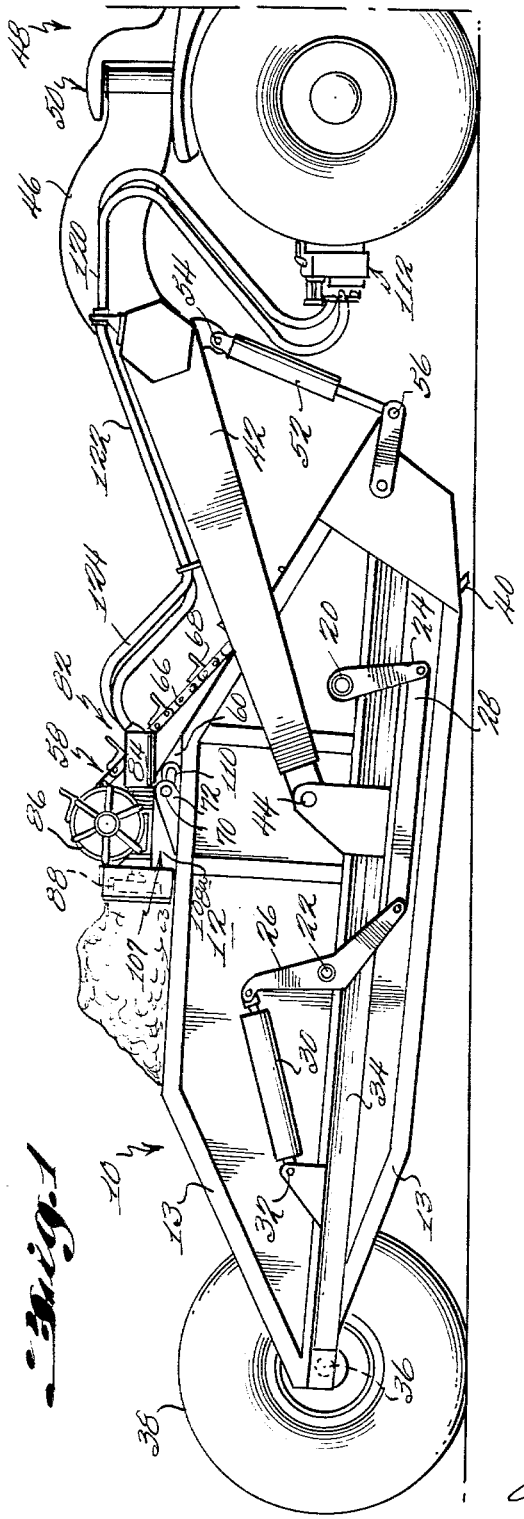

United States Patent Office 3,208,165
Patented Sept. 28, 1965

3,208,165
EARTH SCRAPER WITH HYDRAULICALLY
OPERATED CONVEYOR
Charles M. Johnson and James E. Lowder, Lubbock,
Tex., assignors to Johnson Manufacturing Company,
Lubbock, Tex., a corporation of Texas
Filed Feb. 1, 1963, Ser. No. 255,591
3 Claims. (Cl. 37—8)

This invention relates to earth scraping and moving equipment of the type having a conveyor for moving dirt toward the rear of the bowl or dirt-containing compartment. More in particular, it relates to an improvement in the drive mechanism for the conveyor.

Earth-moving scrapers of the foregoing type are basically open-front mobile compartments provided with wheels so that they may be drawn by a tractor or any other suitable prime mover. In order to reduce the draft necessary to pull such apparatus, a scraper-type conveyors of the endless chain type are often incorporated into the apparatus for moving the dirt scraped up by the scraper blade rearwardly into the compartment. The addition of such a conveyor to scraper-type earth-moving equipment not only effects the afore-mentioned draft reduction but also decreases the time necessary to fill the compartment to its full capacity. While conveyor-equipped scrapers are an improvement over prior scrapers, they are susceptible to additional improvements to increase the efficiency of the conveyor with a resulting reduction in both draft requirements and loading time.

Heretofore, conveyors which have been incorporated into a scraper have been driven by various gear trains, extensible drive shafts and universal joints from a power take-off on the tractor. While these arrangements have operated satisfactorily, the parts thereof are subject to breakage or damage during hard use of the equipment as when large stones are engaged by the conveyor flights. In addition, conventional mechanical drive trains are more or less complex in having to provide for the relative movement between tractor and scraper during turns and when traveling over uneven ground.

In attempting to simplify the drive for the conveyor prior experimenters have suggested the use of a hydraulic motor carried by the scraper. However, these earlier attempts to substitute a hydraulic motor for the conventional mechanical drive met with failure because the hydraulic system rapidly deteriorated from excessive wear.

Accordingly, the primary object of the present invention is to provide a conveyor-equipped scraper having a reliable hydraulic drive which effectively operates the conveyor over long periods of time.

Another object of the invention is to provide a conveyor-equipped scraper having a conveyor drive which is not adversely affected by sudden loads placed on the conveyor, yet which is simple in construction and operation.

It is a further object to provide a conveyor-equipped scraper having a hydraulic motor in combination with a high inertia means for driving the conveyor. The action of the high inertia means prevents destructive pressure surges in the system when the conveyor flights meet with sudden resistance to movement, maintains a steady, continuous movement of the conveyor which otherwise would tend to stop upon meeting sudden resistance and reduces the power necessary to operate the conveyor. The use of flexible conduits in place of the conventional mechanical drive elements which transmit power from the power source on the prime mover, simplifies the power-transmitting drive and permits greater relative movement between the scraper and prime mover than has heretofore been practical with mechanical power-transmitting drives.

These and other objects and advantages will become apparent from the following description and accompanying drawings in which:

FIGURE 1 is a side elevational view of a conveyor-equipped earth scraper embodying the principles of the present invention;

FIGURE 2 is a side elevational view, partly in section, of the scraper of FIGURE 1 with some of the parts in a different position;

FIGURE 3 is an enlarged fragmentary side view, on an enlarged scale and partly in section, of the conveyor drive of FIGURES 1 and 2;

FIGURE 4 is a side elevational view, partly in section, of a first modification of the scraper of FIGURE 1; and FIGURE 5 is a fragmentary side elevational view of a second modification of the conveyor drive of FIGURE 1.

Referring to FIGURES 1 and 2 there is shown therein an open-top and open-front earth scraper 10 of the general type disclosed in Patent No. 2,984,022 and having side walls 12 and rear wall 14 mounted on suitable exterior frame members 13. The bottom of the scraper 10 is formed by two dumping doors 16 and 18, each mounted for swinging movement about a horizontal axis by bolts 20, 22 which pivotally connect upstanding ears (not shown) at the sides of each door with the scraper side walls 12.

Outside the side walls 12 the bolts 20 and 22 are secured to arms 24 and 26, respectively, which are pivotally connected at their lower ends to a link 28. The rearward arm 26 is pivotally connected at its upper end to one end of a double-acting hydraulic cylinder 30 which is pivotally connected at its other end at 32 to a reinforcing member 34 which forms part of the frame. The reinforcing member 34 and its counterpart on the opposite side extend rearwardly of the rear wall 14 and are supported on the opposite ends of an axle 36 on which are journalled ground-engaging wheels 38. Immediately in advance of the front dumping door 18, there is provided a forwardly and downwardly extending fixed scraper blade 40 which extends between the side walls 12.

Two arms 42 of a forked gooseneck structure straddle the forward end of the scraper 10 and have their ends pivotally secured to the reinforcing members 34 at 44. The stem 46 of the gooseneck is releasably connected to the rear end of a tractor 48 or other prime mover by means of a conventional coupling, illustrated at 50, which permits relative rotational movement between the scraper 10 and the tractor 48. A pair of double-acting hydraulic cylinders 52 pivoted at 54 and 56 connect the forward end of the scraper 10 to the arms 42 so that the former may be raised and lowered for dumping and scraping, respectively.

Disposed within the open front of the scraper 10 is an upwardly and rearwardly inclined scraper-type endless conveyor 58 having its lower forward end disposed immediately above the scraper blade 40. As shown, the conveyor has the construction and mountings described in detail in Patent No. 2,984,012, but it will be understood that the details of the conveyor form no part of this invention and that other scraper-type conveyors may be employed. As described in the aforementioned patent, the conveyor 58 includes a pair of longitudinal frame members 60 connected together by longitudinally-spaced transverse members (not shown). Both ends of the frame members 60 are provided with transverse rotatable shafts, the lower of which is shown at 62. Secured on the lower shaft 62 is a pair of transversely-spaced rollers 64 and secured on the upper shaft is a pair of transversely-spaced drive sprockets (not shown). Trained over the corresponding sprockets and rollers 64 and over a pair of idler rollers 65 are a pair of laterally-spaced endless chains 66 to which are connected longitudinally-spaced, transverse scraping flights 68.

The conveyor 58 is supported near its upper rear end by a transverse rod 70 which extends outwardly beyond the conveyor frame members 60 and which is secured thereto as by welding. The rod 70 is supported at its opposite ends by a pair of downwardly and rearwardly extending short lever arms 72 which are located inwardly of the scraper side walls 12. The rod 70 is rotatable in the upper ends of the lever arms 72 and the lower ends of the arms are pivoted to the scraper side walls 12 as by bolts 74. A pair of upwardly and rearwardly extending long lever arms 76 are pivoted to the bolts 74 and to a transverse rod 78 which is secured as by welding to the conveyor frame members 60 near their lower ends.

By means of this construction, which is described more in detail in the aforementioned Patent No. 2,984,022, the forward lower end of the conveyor 58 can move upwardly on encountering rocks or similar material scraped up by the scraper blade. In addition, the weight of the conveyor and the action of springs (not shown) constantly urge the conveyor's forward end downwardly so that the flights 68 normally dig deep into the dirt 80 and thereby keep the scraper blade 40 relatively free of accumulated dirt.

According to the present invention, the conveyor 58 or any other conveyor which might be used in this location is driven by a hydraulic motor mounted on the scraper in combination with a flywheel, or its equivalent, in order to dispense with the usual complicated mechanical drive between scraper and prime mover and at the same time provide an efficiently operating conveyor. In the preferred embodiment shown in FIGURES 1–3, a motor and flywheel unit 82 is secured on the upper end of one of the conveyor frame members 60 so that no universal joints or telescoping shafts are required between the drive unit 82 and the conveyor 58.

As seen in FIGURES 1–3, the drive unit 82 includes a conventional reversible hydraulic motor 84, a gear reduction unit 86 and a disk-shaped flywheel 88, all contained within a common housing 90 which may be formed of several pieces as necessary. The gear reduction unit 86 has an input shaft 92 suitably journalled near each end by a bearing 94 mounted in the housing 90 and is connected to the output shaft of the motor 84. Intermediate its ends the shaft 92 is provided with a worm 96 which engages a gear 98 for driving the reduction unit and its output shaft 99. The flywheel 88 is connected to the end of the input shaft 92 opposite the motor 84 in any convenient manner, as by a radial key 100 between the shaft 92 and a hub 102 on the flywheel 88 and by a bolt 104 passing axially through the flywheel 88 into the shaft 92.

The drive unit 82 is mounted on the conveyor 58 in such a position that the gear reduction output shaft 99 is axial with the upper drive sprocket (not shown) of the conveyor so that no universal joints are required. As shown, the unit 82 is connected to the conveyor 58 by means of an inverted channel shaped member 107 having depending vertical side walls 108 and 108a and a horizontal connecting portion 109. The drive unit 82 is secured to the upper surface of the horizontal portion 109 in any convenient manner. The side walls 108, 108a of the support channel 107 are located between the upper end of the conveyor 58 and the right scraper side wall 12 as viewed in the drawings, and the side wall 108 which is closest to the conveyor 58 is secured to the upper end of the adjacent conveyor frame member 60 as by welding or with bolts.

In the particular construction being described and as fully described in the aforesaid Patent 2,984,022 the upper ends of the conveyor frame members 60 are formed of extension members which are longitudinally adjustable with respect to the remainder of the frame members 60 so as to permit the distance between the upper and lower conveyor sprockets to be adjusted. Conveniently, the inner side wall 108 of the drive unit support 107 is secured to the extension portion of the adjacent conveyor frame member 60. When this is done, the drive unit 82 is longitudinally adjustable along with the extension portion. Since the conveyor supported rod 70 is secured to the non-adjustable portion of the frame members 60, each of the side walls 108 and 108a of the drive unit support are provided with an upwardly and rearwardly extending slot 110 through which the rod 70 passes.

Hydraulic fluid for operating the motor 84 is supplied to and exhausted from the motor by means of conduits leading from a hydraulic pump 112 located on the tractor 48 or other prime mover. As shown, the pump 112 is mounted on the rear of the tractor frame and is controlled by the tractor operator through a movable control rod 114. A conventional pump control valve 116 is provided on the pump 112 and is arranged to be actuated by the rod 114 as by means of a link 118. Each of the supply and return conduits to the motor 84 includes a flexible hose portion 120 leading from the pump 112 to a rigid tube portion 122 mounted on top of one of the gooseneck arms 42 and another flexible hose portion 124 connected to the motor 84. It will be understood that the hydraulic system includes the usual safety and control features such as relief valves and bypasses conventionally provided in hydraulic systems. While the pump 112 has been shown as mounted on the tractor 48, it could be mounted on the scraper 10 if desired.

In the embodiment illustrated in FIGURE 4, wherein primed reference numerals indicate parts which are the same as or similar to those already described, the hydraulic motor 84, is rigidly secured to the top of the gooseneck structure at the junction of the arms 42' and the stem 46'. The pump 112', as before, is located on the rear of the tractor 48' and is provided with a control valve 116', control rod 114' and flexible hoses 120' leading to the motor 84'.

The gear reduction unit 86' in the FIGURE 4 embodiment is spaced from the motor 84' and is mounted on the upper end of the right conveyor frame member 60' by means of a channel-shaped support 107' in the same manner as the combined drive unit 82 in the embodiment of FIGURES 1–3. A telescopic drive shaft 126 provided at each end with a conventional universal joint 128 connects the motor 84' with the input of the gear reduction unit 86'. The drive shaft 126 is conventional except that it is of relatively great weight so as to provide the inertia effect of a flywheel. Alternatively, as shown in FIGURE 5, the shaft 126' may be of relatively light construction and a separate flywheel 130 may be inserted between the motor 84' and the forward universal joint 128. While the arrangements of FIGURES 4 and 5 perform satisfactorily, the construction of FIGURE 1 is preferred from the standpoints of simplicity, cost and convenience.

In operation, the scraper 10 is used in the conventional manner to scrape dirt from the surface of the ground and to dump the scraped dirt in the form of a layer extending along a desired path. For scraping dirt the tractor operator lowers the front of the scraper by extending the ram 52 to engage the scraper blade 40 with the surface of the ground. The scraper is then pulled forwardly by the tractor 48 so as to cause the blade 40 to dig into the ground. The loosened dirt 80 passes up over the blade 40 where it may be acted upon by the flights 68 of the conveyor 58.

During a scraping operation the conveyor 58 is operated in a clockwise direction, as viewed in FIGURE 1, by means of the pump 112 and drive unit 82. The flights 68 of the conveyor 58 engage the loosened dirt 80 and move it rearwardly into the scraper thus filling the scraper in a shorter time than is possible without a conveyor. During a dumping operation, as seen in FIGURE 2, the front of the scraper 10 is raised, the dumping doors 16 and 18 are rotated clockwise and the conveyor may be operated counter-clockwise as the scraper 10 is moved forwardly.

With the construction described above which permits the lower end of the conveyor to ride up on rocks and other debris, jamming of the flights and consequent stresses and breakage in the conventional mechanical drive are relatively few. Consequently, it was at first believed that substitution of a hydraulic drive for the mechanical drive would be a simple matter. However, it was found upon installing and operating a hydraulic drive for the conveyor that even under optimum conditions the hydraulic system rapidly deteriorated from excessive wear, the cause of which was not apparent.

After extensive experimentation it was found by continuously measuring the pressure within the hydraulic system that extremely high pressure surges occurred each time a conveyor flight engaged and bit into the loosened dirt. In fact, even with a drive system of the same horsepower as was used in the mechanical arrangement, the conveyor would come substantially to a stop as each flight bit into the dirt. Increasing the horsepower of the hydraulic system with a corresponding increase in cost tended to maintain continuous movement of the conveyor but it was still found that pressure surges of such magnitude occurred that destruction of the flexible hoses and ultimately of the pump and motor still occurred.

Ultimately, it was found that incorporating a flywheel or its inertial equivalent in the hydraulic drive for the conveyor not only maintains the conveyor in continuous motion, but that it also unexpectedly eliminates the destructive high pressure surges in the hydraulic system. Unexpectedly, also, it accomplishes these advantages in a relatively low power system so that the power output of the pump and motor need not be increased as was formerly believed to be necessary.

As an example of the advantages of the present invention, a 10 cubic yard scraper was fitted with a conveyor of the type described above. Normally, a machine of this type requires a conveyor drive of about 30 HP when using a conventional mechanical drive. However, it was found that a 30 HP hydraulic system using a 1450 r.p.m. motor and a 22.1 gear reduction unit to operate the conveyor developed destructive pressure surges of 0–4000 p.s.i. each time a conveyor flight engaged the loosened dirt. In addition, the conveyor came to a brief stop at each engagement thus preventing smooth operation and producing a tendency to jam if large stones are present. Substituting a 90 HP hydraulic system for the 30 HP system did not substantially improve operation. With the more powerful drive the conveyor did not actually stop at each engagement of a flight with the dirt but the destructive pressure surges in the system were not eliminated.

However, when a 55 pound flywheel having a diameter of 11¾ inches was incorporated in the drive between the above-described motor and gear reduction unit as illustrated in FIGURE 1 the conveyor maintained a constant speed. The primary advantage, however, was in the substantial and unexpected elimination of destructive pressure surges in the hydraulic system. Under normal operating conditions it was found that pressure within the system remained substantially constant at 1400 p.s.i. with variations of only 200 p.s.i. occurring upon engagement of a flight with the loosened dirt.

From the above it will be appreciated that the primary advantage of the present invention is the provision of a scraper having a hydraulically driven conveyor which is effective, reliable and long lasting, whereas prior attempts to substitute a hydraulic drive for the conventional mechanical drive in a scraper-conveyor combination have met with little or no success. Thus, the incorporation of a flywheel or its inertial equivalent in the hydraulic drive as taught by the invention not only effects proper operation of a scraper-conveyor combination, but also permits other useful features of a hydraulic drive to be taken advantage of in the combination.

It will be apparent, for example, that any jamming of the conveyor 58 by large stones or other debris may be easily corrected by temporarily reversing the direction of the motor 84 and conveyor 58 by operation of the valve 116. Additionally, and even more important, the conveyor drive system is very much simplified in that no telescopic shafts, universal joints and auxiliary bearings are required between the conveyor drive sprocket and the power source on the prime mover. In place of the complicated and costly mechanical linkages which must transmit rotary motion from a power-take-off on the prime mover and simultaneously permit relative movement between the scraper and prime mover a hydraulic system requires only flexible hoses connected between the scraper and prime mover. Thus the scraper can negotiate very rough ground and sharp turns without danger of damaging or breaking the power transmitting drive for the conveyor.

While several embodiments of the invention have been described and illustrated, it is apparent that modifications within the scope of the invention will occur to those skilled in the art and it is not intended that the above details be limiting except as they appear in the appended claims.

What is claimed is:

1. In an earth-moving apparatus which includes a mobile open-front dirt-carrying container, a dirt-digging scraper blade carried by said container, an endless rigid-frame scraper-type conveyor within said container for moving dirt rearwardly into said container, said conveyor having a plurality of flights which sequentially dig into the earth which passes into said container, the improvement in drive means for said conveyor comprising: hydraulic motor means; flexible fluid conduit means for delivering pressurized fluid from a fluid source to said motor means; speed reducing means driven by said motor means through rotating power transmitting means, said speed reducing means having an output shaft driving said conveyor; mounting means fixedly mounting said motor means and said speed reducing means on said conveyor frame; rotatable high inertia means driven by said motor means, rotatable with said power transmitting means and having a mass of sufficient magnitude to minimize destructive pressure surges within the pressurized fluid, said high inertia means including a flywheel connected to said power transmitting means.

2. Earth-moving apparatus as in claim 1 wherein said hydraulic motor means is reversible whereby said endless conveyor may be driven in either direction.

3. Earth-moving apparatus comprising: a mobile open-front dirt-containing container having ground engaging wheels and a dirt-digging scraper blade at the front of the container; an endless scraper-type conveyor having a rigid frame carrying a pair of endless chains and a rotatable shaft carrying sprockets for driving said chains, said conveyor being pivotally mounted in the forward part of said container for rotation about a horizontal axis so as to ride up on material passing over said blade into said container; a drive unit fixedly mounted on said conveyor frame, said drive unit including a hydraulic motor and a speed reducing transmission, said transmission having an input shaft driven by said motor and an output shaft axial with and connected to said conveyor drive shaft, said drive unit further including a flywheel connected to said input shaft and rotatable therewith.

References Cited by the Examiner

UNITED STATES PATENTS

| | | | |
|---|---|---|---|
| 1,097,911 | 5/14 | Brugger | 37—8 X |
| 2,301,098 | 11/42 | Twyman. | |
| 2,620,575 | 12/52 | Pace | 37—8 |
| 2,674,853 | 4/54 | Born | 198—203 X |
| 2,741,895 | 4/56 | Horvath | 60—53 |
| 2,984,022 | 5/61 | Johnson | 37—8 |
| 3,043,029 | 7/62 | Allard. | |
| 3,143,814 | 8/64 | Brinkmeyer | 37—8 |

ABRAHAM G. STONE, *Primary Examiner.*

BENJAMIN BENDETT, BENJAMIN HERSH,
*Examiners.*